G. W. Stewart.
Harvester Dropper.
N° 85254
Patented Dec. 22, 1868
Sheet 3
4 Sheets.
Fig. 4.
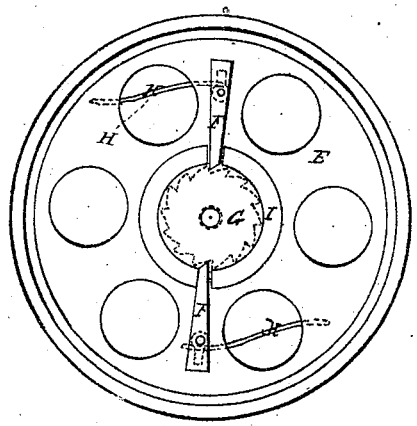
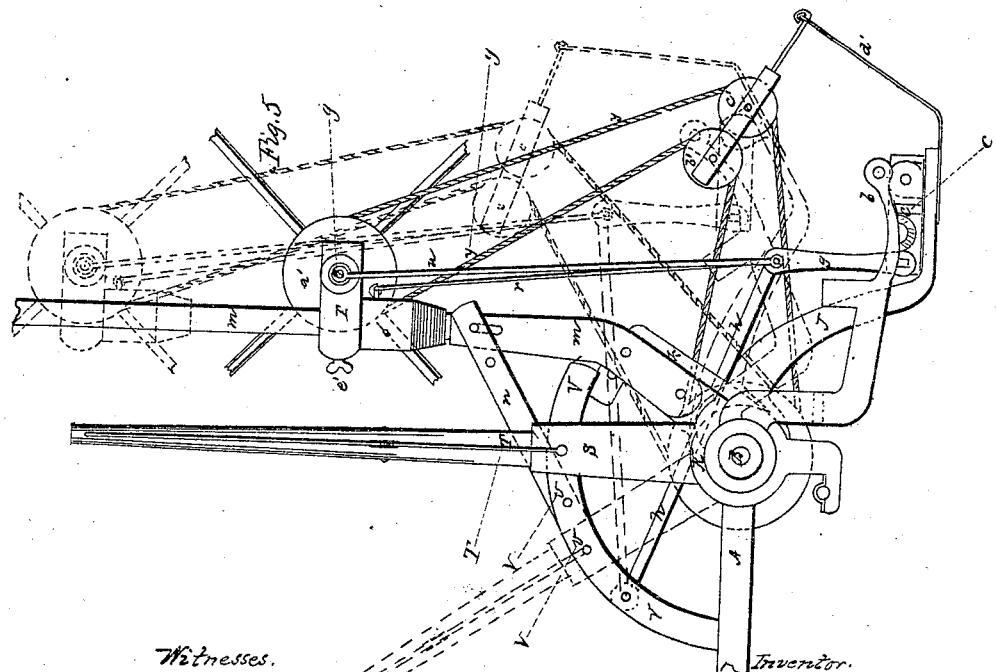
Witnesses.
A. E. Lemuele
C. H. Bishop.
Inventor.
Geo. W. Stewart
by Prindle & Co. Attys.

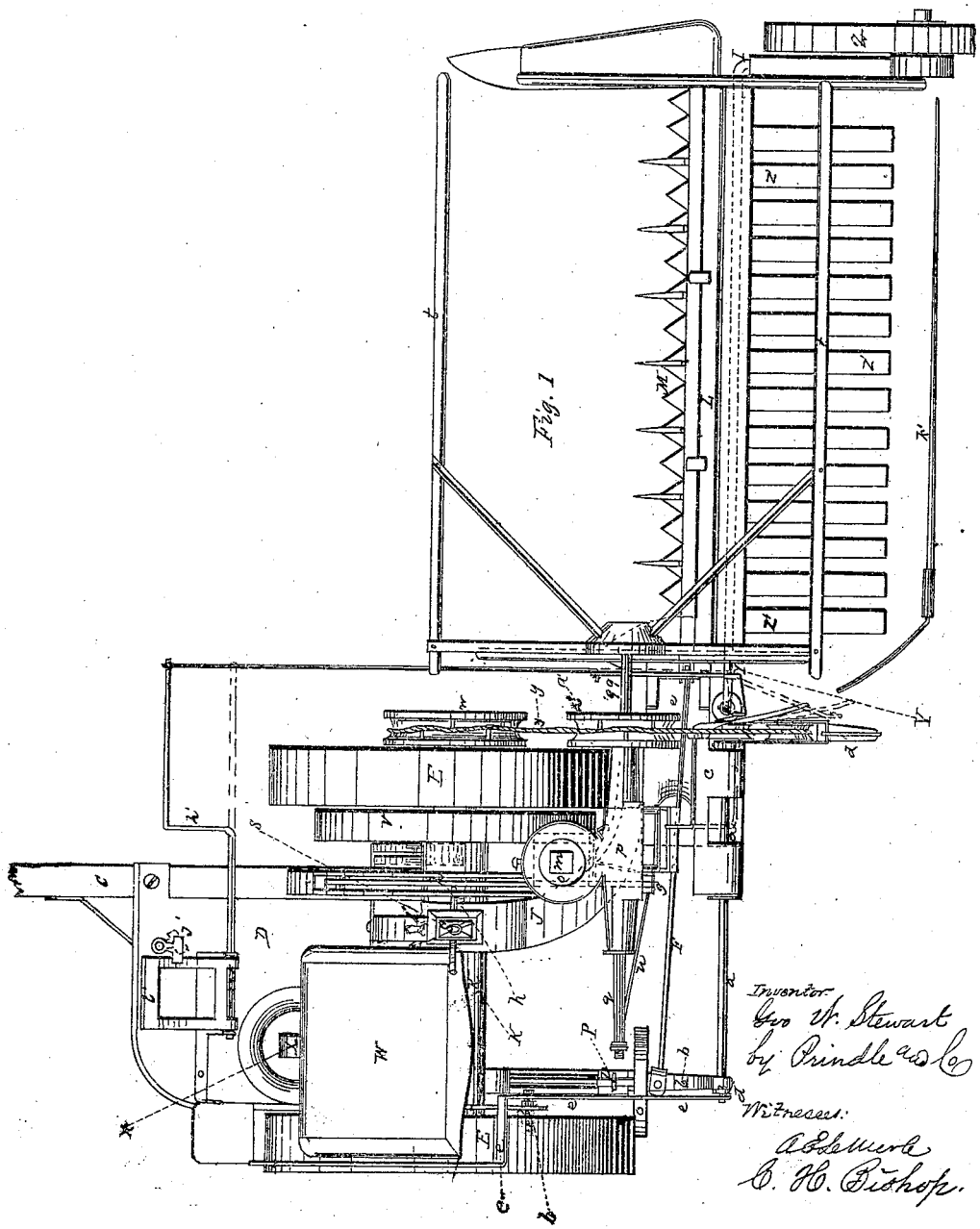

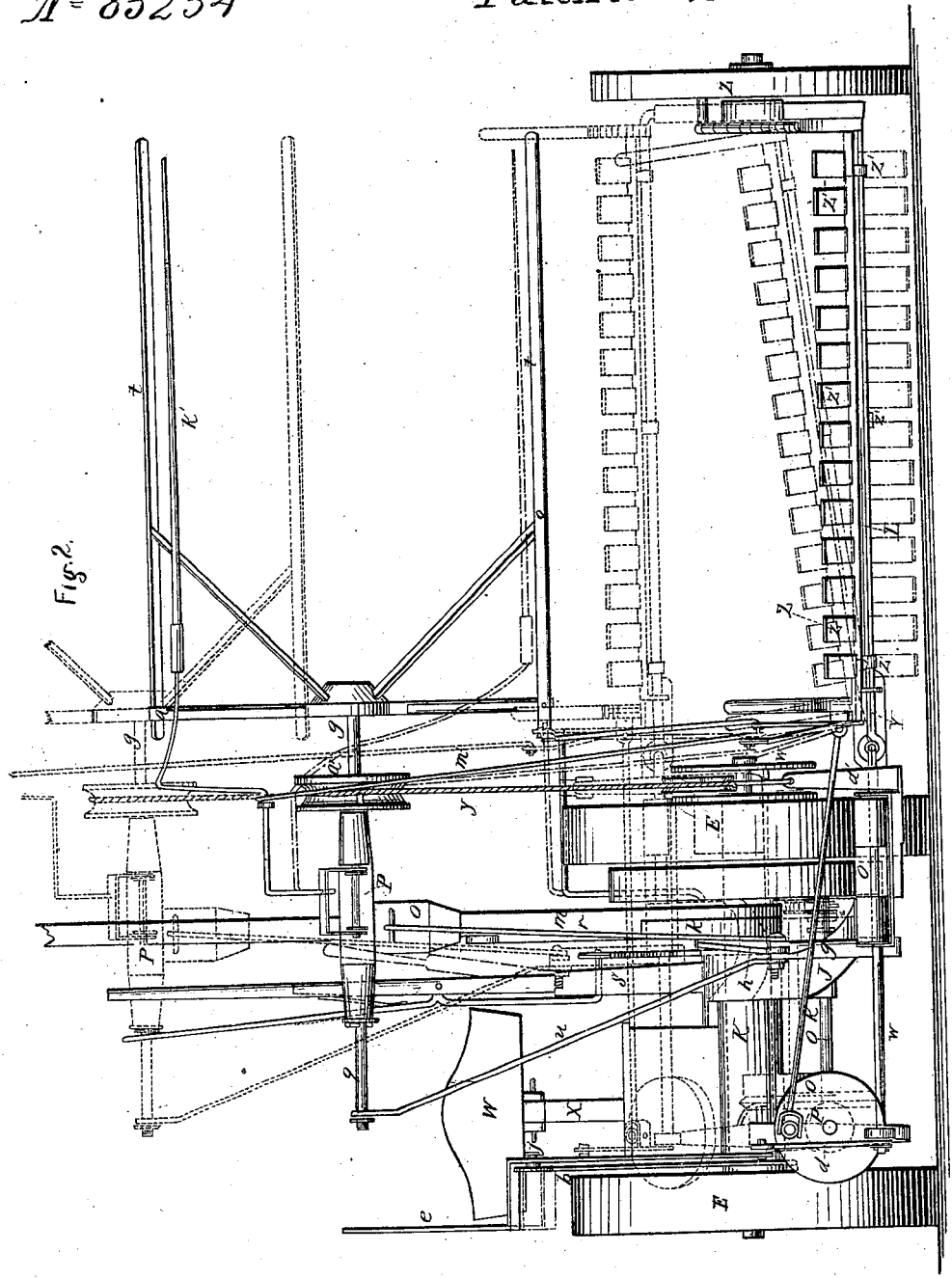

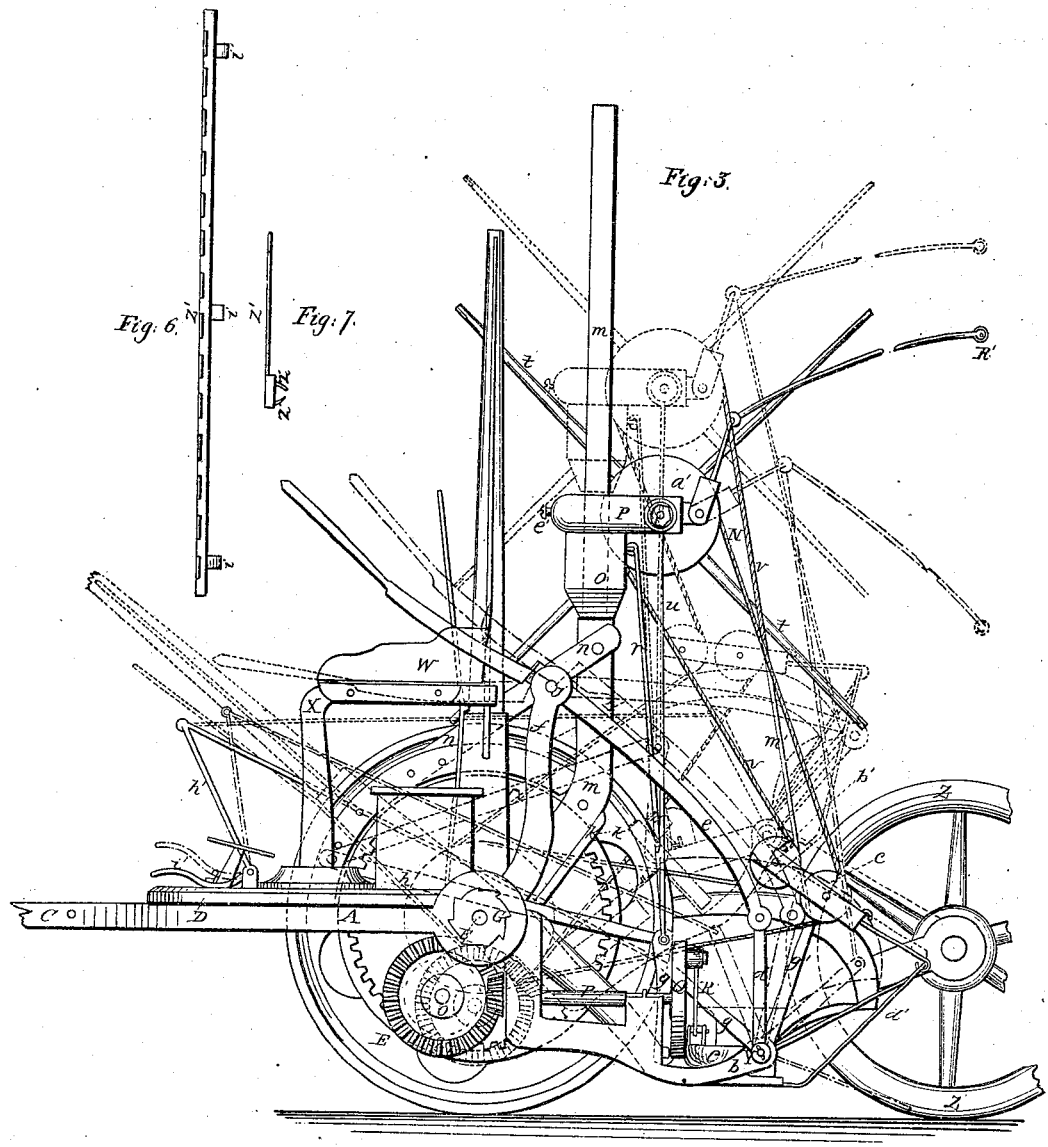

UNITED STATES PATENT OFFICE.

GEORGE W. STEWART, OF ADAIRSVILLE, ASSIGNOR TO HIMSELF AND WARREN AKIN, OF CARTERSVILLE, GEORGIA.

IMPROVEMENT IN HARVESTERS.

Specification forming part of Letters Patent No. 85,254, dated December 22, 1868.

*To all whom it may concern:*

Be it known that I, GEORGE W. STEWART, of Adairsville, in the county of Cass, and in the State of Georgia, have invented an Improved Reaping and Mowing Machine; and do hereby declare that the following is a full, clear, and exact description thereof, reference being had to the accompanying drawings, making a part of this specification, in which—

Figure 1 is a plan view. Fig. 2 is a rear elevation. Fig. 3 is an end elevation. Fig. 4 is a detached view of the driving-wheel, showing the arrangement of the ratchet and pawls. Fig. 5 is a sectional end elevation, showing the devices for raising and lowering the cutter-bar. Fig. 6 is an edge view of the dropper, showing the lugs used for securing it to the shaft. Fig. 7 is an end view of the same.

Letters of like name and kind refer to like parts in each of the figures.

In many portions of the country wheat and other small grain are frequently planted upon land recently cleared of its timber, the stumps being suffered to remain, and usually standing from one to two feet above the ground. It is manifestly impossible to reap a field interspersed with such obstructions, unless the cutting apparatus of the machine is capable of an up-and-down movement bodily, and parallel with the ground, at the discretion of the attendant, and without interfering with or interrupting the operation of the cutters.

To elevate one end of the cutting apparatus while the other end remains on the ground will not suffice when the obstructions to be avoided are more than a few inches in height, because it will frequently be necessary to elevate one or the other end so high as to carry it above the tops of the grain, while, with the cutting apparatus arranged to rise and fall bodily, and always parallel with the ground, any obstruction may be passed which is not higher than the heads of the standing grain.

Fields obstructed as described are common at the South, where there is little or no prairie land, and where the expense of clearing the land from stumps is too great to be borne.

My invention consists, first, in attaching the cutting apparatus of a harvester to its main frame, in such a manner that the attendant can, at will, raise said cutting apparatus bodily from the ground without destroying its parallelism therewith, to pass over obstructions, while at the same time the cutting apparatus may be left free to rise or fall at either end thereof with the undulations of the ground over which it is drawn; second, in the devices by which the above-named operation of the cutting apparatus is obtained; third, in the manner of hanging the reel, so as to preserve its relative distance from and adjustments to the cutting apparatus; fourth, in the mode of attaching the dropper.

In the annexed drawings, A represents the main frame, intended to be constructed of iron, with the main axle B resting in bearings at the rear end of said frame. The tongue C is bolted to one side of the frame A, and the foot-board D is secured upon its top. The supporting and driving wheels E E are mounted upon the ends of the axle B, and are secured thereon in any convenient way. At the inner side of each wheel E is a ratchet-wheel, G, secured to the axle B by a key, or some equivalent device; and mounted upon the inner side of said wheel are two spring pawls or latches, F, working perpendicularly into the teeth of the ratchet G. The latches F are guided by slots or lugs, and are thrown forward by springs H. The hub I of the wheel E is chambered, so as to receive the ratchet G, and the ends of the latches are projected through notches made in opposite sides of the hub, as is fully shown in Fig. 4. By this arrangement there are no pins or bearings to be worn away, the strain upon the latches being a shearing strain only.

The dragging-frame J is also constructed of iron, with a sleeve, K, at its front end, through which the main axle B passes and rests in suitable bearings.

To the lower and rear end of the dragging-frame J is jointed the cutting apparatus L, as shown in Fig. 2, so that either end of said cutting apparatus may rise or fall independently, to pass over the inequalities of the ground.

The cutters M are caused to reciprocate by means of the internal gear-wheel H, secured to the main axle B, and operating through the counter-shafts O and P, and the crank and pitman Q and R and their pinions. The counter-shafts are supported by hangers, secured to the dragging-frame, or cast with it, as shown in the figures.

Projecting upward from the inner end of the sleeve K is a lever, S, which is provided with a latch, T, the end of which engages in one of a series of holes, U, made in the curved standard V, which is secured to the main frame, as shown in Fig. 5.

As said lever is moved along said standard it causes a partial rotation of the sleeve K upon the axle B, and a consequent elevation or depression of the rear end of the dragging-frame and the cutting apparatus jointed thereto. This movement is fully shown in red in Fig. 5.

The driver's seat W is mounted upon a leg, X, in such a manner that it may be adjusted forward or backward, as may be desired.

By the operation of the devices thus far described the cutting apparatus may rise and fall with the undulations of the ground, or its inner end may be elevated as desired, and retained at any desired height above the ground. These movements, being well known, require no further description.

I will now describe particularly the mode of securing the up-and-down movement of the cutting apparatus parallel with the ground.

Along the rear of the finger-bar, and secured thereto in suitable loops or bearings, is a stout rod, Y, the outer end of which, in rear of the outer shoe, is turned backward at a right angle, or thereabout, as seen in Fig. 1, and at its end supports the axis of the grain-wheel Z. Now, it is apparent that if the rod Y is caused to rotate on its axis, the axle of the grain-wheel Z will be either raised or depressed in respect to the cutting apparatus; but, as the grain-wheel rests on the ground, it follows that any rotary movement of the rod must act to raise or depress the outer end of said cutting apparatus.

The rod Y, at its inner end, opposite the joint of the inner shoe, is jointed to the extension-rod $a$, which rests in bearings at both of its ends, one of said bearings being arranged upon the rear end of the dragging-frame J, and the other upon an arm, $b$, extending downward and backward from the outer end of the sleeve K.

The cutting apparatus is jointed to a block, $c$, which is itself jointed to the rear end of the dragging-frame J by the rod $a$, which passes through said block and through suitable lugs cast on the frame J, so that the cutting apparatus may have a movement upon the axis of said rod, which permits the points of the guard-fingers and cutters to be raised and lowered equally with the finger-bar, and thus secures the horizontality of the cutters.

The rod $a$ has at its outer end a lever, $d$, projecting upward and connecting with a rod, $e$, which is provided with a catch to connect it with a post, $f$, rising from the rear end of the main frame.

Now, the centers of the axle B and rod Y are connected by a line about parallel with a line connecting the joint between $d$ and $e$ and the catch between $e$ and $f$, and it follows that when the dragging-frame J is raised, carrying with it the cutting apparatus and rods Y and $a$, the lever $d$ will be caused to assume a different angle to the dragging-frame, and the rod Y partially rotated, so as to raise the outer end of the cutting apparatus, and it is an easy matter to so adjust the proportions and distances of these parts as that the outer end of the cutting apparatus will be raised upon the wheel Z, by the rotation of the rods Y and $a$, to the same height as the inner end is raised by the elevation of the rear of the dragging-frame.

The block $c$ is provided with a short post, $g$, which is rigidly secured thereto, and the top of which is connected to the main frame by a rod, $h$, so as to produce a similar parallel movement of the cutting apparatus, to preserve the horizontality of the plane of the cutters during all of the up-and-down movements of the cutting apparatus. This is of the highest importance, as the efficiency of the cutters will decrease in proportion to the departure of their plane from a position at a right angle to the stalks to be severed.

The rod $e$ is provided with a notch, $i$, (shown in blue lines, Fig. 3,) which locks over the pin $j$, set in the head of the post $f$, to resist the endwise thrust of said rod when the cutting apparatus is being raised from the ground, as described. This notch may be disconnected from the pin $j$, and the effect will be to lower the outer end of said cutting apparatus, so as to permit it to slide upon the ground, as is required when the machine is used for mowing grass. The latch T of the lever S should at the same time be withdrawn, so as to permit the inner end of the cutting apparatus to rest upon the ground also.

When arranged in this way, the cutting apparatus will be free to rise and fall at either end, to conform to the inequalities of the ground over which it is drawn, while either end may be temporarily raised from the ground to clear any obstruction which may be in the line of the cut, the outer end by pushing backward upon the rod $e$, so as to raise said end upon the wheel Z, and the inner end by pushing forward the lever S.

From the foregoing description it will appear that the cutting apparatus of this machine may run upon the ground and be perfectly flexible to follow the undulations thereof, for the purpose of mowing grass; and that while arranged for reaping grain the cutting apparatus may be raised bodily from the ground without materially changing its parallelism thereto in any respect, so that it may be passed over stumps or other obstructions upon the ground without interrupting the operation of cutting the grain; and while operating in the manner described, the outer end of the cutting apparatus may rise or fall with the undulations of the ground independently of the main frame and driving-wheels.

At the inner side of the main frame is a post, $k$, with a short segment projecting forward from its upper end. To the side of this post is bolted the reel-post $m$, secured with two bolts, the lower one of which may act as a pivot-bolt when it is necessary to adjust the reel forward or backward, while the upper bolt secures said post in the desired position by being passed through one of a series of holes in the short segment described. The reel-post $m$ is still further supported by the brace $n$, which reaches forward to the front part of the main frame. The post $m$ is angular, and has a sleeve, $o$, of corresponding internal form, fitted to slide up and down upon it. The upper end of the sleeve $o$ is made cylindrical, to receive a collar, $p$, which bears the reel-shaft $q$.

The collar $p$ is connected to the head of the post $g$ by means of a rod, $r$, so that when the dragging-frame and reel of the cutting apparatus are raised the collar $p$, reel-shaft $q$, and reel $t$ will be pushed up equally and the relative distance of said reel from the cutting apparatus preserved. A rod, $u$, connects the head of the post $g$ with the outer end of the reel-shaft $q$; but it acts only as a brace to support said end of the reel-shaft.

The collar $p$ may rotate upon the sleeve $o$, so as to adjust the reel in relation to the cutting apparatus, and the set-screw $e'$ will retain it in any desired position.

The reel-shaft is driven from a pulley, $w$, upon the inner end of the main axle, by means of the belt $y$ and pulley $a'$; and said belt is maintained at the proper tension at all times by passing under the tightening-pulleys $b'$ $c'$, which are hung upon the spring $d'$, secured to the rear end of the dragging-frame J.

When my machine is employed for reaping purposes, a platform of any usual form may be used in connection therewith, if desired. I do not represent any platform, as I do not consider it essential; but I desire to show and describe a dropping attachment which I have invented.

This dropper $Z'$ is constructed in the ordinary slatted form, as shown in Fig. 1, and is attached to the rod Y, by means of several small lugs of sheet metal, $z'$ $z'$ $z'$, as shown in Figs. 6 and 7.

The lugs $z'$ are inserted in the dropper in two parallel lines, the distance between which is a little more than the diameter of the rod Y, and each lug is bent inward, so as to clasp said rod and attach the dropper securely thereto, and at the same time allow it to turn on the rod as an axis. By this arrangement the dropper may be readily disengaged from or adjusted to the rod, the lugs being easily sprung open sufficiently to allow said rod to pass.

Attached to the inner end of the dropper is a short lever, $g'$, which is connected to a lever and treadle, $h'$ $i'$, at the front end of the main frame.

When the treadle $i$ is depressed, it raises the dropper to a horizontal position, and it may be secured in that position by a latch, $j'$. When this latch is pushed to one side by the foot, the rear end of the dropper is permitted to fall to the ground, and the gavel be discharged.

A pole, $k'$, is hung by arms upon the reel-shaft, and moves up and down thereon as a center. It is connected by a rod, $m'$, to the head of the dropper-lever $g'$, so that as the dropper descends upon the ground to discharge its gavel the pole $k'$ will be drawn down also, far enough to catch the grain which is being cut during the time the gavel is being discharged; and when the dropper is again raised to its horizontal position the pole $k'$ will also be raised, as shown in Fig. 3, and permit the grain which rested upon it to fall upon the dropper.

The advantages possessed by this machine over all others in use, intended for a like purpose, are—

First, its construction and arrangement place it more completely under control, enabling the attendant, at will, to raise the cutting apparatus bodily from the ground to any height that may be necessary to enable it to pass over stumps or other large obstructions, and at the same time preserve the horizontality of the plane of the cutters, thus enabling said cutters to work with the same efficiency when elevated as when depressed, and rendering it unnecessary to stop their operation in passing such obstructions. It also furnishes means by which either end of the cutting apparatus may be instantly elevated, in order to clear stones or other small obstructions, thus rendering it less liable to injury from contact with such obstacles.

Second, by means of the devices by which the reel is suspended and actuated, its relative distance from and adjustment to the cutting apparatus is at all times maintained, and the driving-belt kept taut, rendering it equally efficient in any position.

Third, the dropper is more completely under the attendant's control, and the manner of attaching it to the rod upon which it is hinged renders it more easy of adjustment or removal.

Fourth, the construction and arrangement of the pawls engaging with the ratchets upon the axle, by means of which said axle and the driving-wheels are connected together when moving forward, are more simple and durable than any other in use.

Having thus fully described the nature and merits of my improvement, what I claim as my invention, and desire to secure by Letters Patent, is—

1. The combination and arrangement of the devices by means of which the cutting apparatus may be elevated or depressed while preserving the horizontality of the plane of the cutters, consisting of the dragging-frame J, block c, post g, bar h, rods a and Y, grain-wheel Z, arm d, rod e, and post f, substantially as and for the purpose shown.

2. Also, the arm h, jointed to the main frame at its forward end, and the dragging-frame J, in combination with the block c, to which said arm and frame are jointed at the front and rear edges, so that as the rear end of the dragging-frame J is raised up the plane of the block c and cutting apparatus will in all positions be parallel with the ground, substantially as shown and described.

3. Also, the arms b and e, jointed to portions of the main frame at their forward ends, in combination with the arm d, rods a and Y, grain-wheel Z, and cutting apparatus of a harvester, so that as the inner end of said cutting apparatus is raised up the outer end will be equally raised, substantially in the manner and for the purpose set forth.

4. Also, the manner of suspending the reel by means of the post m, sleeve o, collar p, and rod r, the latter being pivoted at its lower end to the head of the post g, substantially as shown and described.

5. Also, suspending the reel-shaft g by means of the sleeve o (made to slide upon the reel-post m) and the rod r, which connects said sleeve with the block c, and preserves a constant distance between the reel and cutting apparatus, substantially as herein specified.

6. Also, the means for attaching the dropper to the rod Y, consisting of the lugs $z'$ $z'$ $z'$, arranged substantially as herein shown and described.

In testimony that I claim the foregoing I have hereunto set my hand this 24th day of July, 1868.

GEO. W. STEWART.

Witnesses:
 EDM. F. BROWN,
 J. R. HOPKINS.